United States Patent
Milojicic et al.

(10) Patent No.: US 10,261,882 B2
(45) Date of Patent: Apr. 16, 2019

(54) FUNCTIONAL UNIT PROMOTION TO MANAGEMENT UNIT

(71) Applicant: Hewlett Packard Enterprise Development LP, Houston, TX (US)

(72) Inventors: Dejan S. Milojicic, Palo Alto, CA (US); Yuan Chen, Sunnyvale, CA (US); Daniel J. Gmach, Palo Alto, CA (US); Vanish Talwar, Campbell, CA (US); Zhikui Wang, Fremont, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 163 days.

(21) Appl. No.: 15/114,086

(22) PCT Filed: Jan. 31, 2014

(86) PCT No.: PCT/US2014/014202
§ 371 (c)(1),
(2) Date: Jul. 26, 2016

(87) PCT Pub. No.: WO2015/116180
PCT Pub. Date: Aug. 6, 2015

(65) Prior Publication Data
US 2017/0046240 A1     Feb. 16, 2017

(51) Int. Cl.
*G06F 11/30* (2006.01)
*G06F 1/3287* (2019.01)
(Continued)

(52) U.S. Cl.
CPC ........ *G06F 11/3055* (2013.01); *G06F 1/3215* (2013.01); *G06F 1/3287* (2013.01);
(Continued)

(58) Field of Classification Search
CPC .. G06F 11/30; G06F 11/3006; G06F 11/3024; G06F 11/3055; G06F 11/3409;
(Continued)

(56) References Cited

U.S. PATENT DOCUMENTS 7,953,993 B2    5/2011  Allarey et al.
8,122,269 B2 *  2/2012  Houlihan .............. G06F 1/3215
                                             713/320
(Continued)

FOREIGN PATENT DOCUMENTS

JP        2012-247849 A      12/2012

OTHER PUBLICATIONS

Larsson, S.O., "Capacity Management with Logical Links," Karlsokrona, Jul. 2000, 140 p.
(Continued)

*Primary Examiner* — Fahmida Rahman
(74) *Attorney, Agent, or Firm* — Hewlett Packard Enterprise Patent Department (57) ABSTRACT

A system comprises a plurality of functional units powered via a power source. The system further comprises a first functional unit and a second functional unit, wherein the second functional unit is to promote the first functional unit to a management unit based on a management requirement of the system. The management unit is to administrate operations of the system. Once the first functional unit is promoted, the management unit is isolated from the functional units that were not promoted via a virtual network path and a power management unit.

17 Claims, 5 Drawing Sheets

(51) Int. Cl.
  *G06F 9/50* (2006.01)
  *G06F 1/3215* (2019.01)
  *G06F 1/3296* (2019.01)
  *G06F 11/34* (2006.01)

(52) U.S. Cl.
  CPC .............. *G06F 1/3296* (2013.01); *G06F 9/50* (2013.01); *G06F 11/30* (2013.01); *G06F 11/3006* (2013.01); *G06F 11/3024* (2013.01); *G06F 11/3433* (2013.01); *G06F 11/3409* (2013.01); *Y02B 60/1282* (2013.01); *Y02D 10/171* (2018.01)

(58) Field of Classification Search
  CPC .. G06F 11/3433; G06F 1/3215; G06F 1/3287; G06F 1/3296; G06F 9/50; Y02B 60/1282; Y02D 10/171
  See application file for complete search history.

(56) References Cited

U.S. PATENT DOCUMENTS

| | | |
|---|---|---|
| 8,191,043 B2 | 5/2012 | Mohindra et al. |
| 8,312,126 B2 | 11/2012 | Monchiero et al. |
| 8,521,922 B2 | 8/2013 | Haustein et al. |
| 9,524,012 B2* | 12/2016 | Khatri .................. G06F 1/3206 |
| 2005/0154931 A1 | 7/2005 | Oh |
| 2010/0037038 A1 | 2/2010 | Bieswanger et al. |
| 2010/0169968 A1 | 7/2010 | Shanbhogue et al. |
| 2010/0194470 A1 | 8/2010 | Monchiero et al. |
| 2011/0131377 A1 | 6/2011 | Gray et al. |
| 2012/0066535 A1 | 3/2012 | Naffziger |
| 2012/0166764 A1* | 6/2012 | Henry ................. G06F 9/30076 712/43 |
| 2013/0117803 A1 | 5/2013 | Markham et al. |

OTHER PUBLICATIONS

Microsoft Corporation, "Processor Power Management in Windows 7 and Windows Server 2008 R2," Oct. 19, 2012, 40 p.

PCT Search Report/Written Opinion ~ Application No. PCT/US2014/014202 dated Apr. 27, 2015 ~ 10 pages.

* cited by examiner

FUNCTIONAL UNIT PROMOTION TO MANAGEMENT UNIT

BACKGROUND

Computer systems, such as servers, may have the ability to be remotely managed. Remote management may include booting the computers, changing a configuration setting, etc. Additional management unit(s) (e.g., a chip) may be included to enable such remote management. The additional management unit may be a dedicated unit powered by an auxiliary power rail that is "live" (as long as alternating current (AC) power is available), and has a network connection.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

The following discussion is directed to promoting a functional unit to a management unit.

As stated above, a dedicated management unit may be included in a computer to facilitate remote management of the computer. However, this implementation of using a separately dedicated management unit may add to the complexity of remote management due to its limited capacity, relatively high cost, low flexibility and low scalability.

With increasing developments of complementary metal oxide semiconductor (CMOS) technologies, an architecture of a multi-core central processing unit (CPU) has been proposed to meet diverse requirements on power and performance. The multi-core CPU may include at least two or more independent processor cores. This fast pace of development in hardware (e.g., the architecture of the multi-core CPU) stimulates software to provide comparable functionalities and parallelism, and may increase a likelihood of managing complexity.

Example implementations described herein use a core of a multi-core CPU to function as a management unit rather than requiring the computer to have a dedicated management unit. The example implementations dynamically promote one or more processor cores, or functional units, to management units while generally introducing no additional power, network resources, and without the inclusion of an additional chip or component to be installed in the computer system as a dedicated management unit.

It is appreciated that certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

Figure 1A:
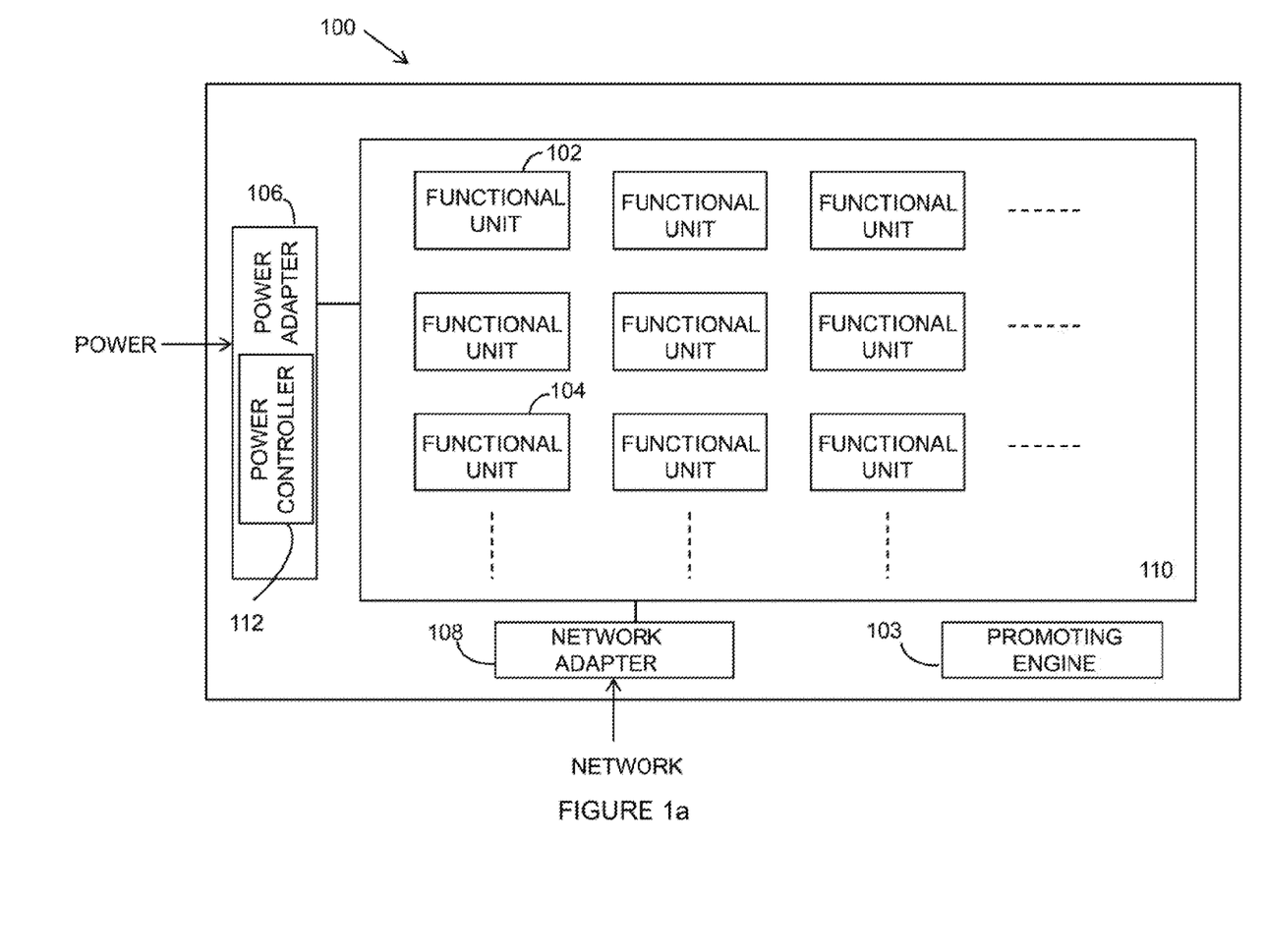
FIG. 1a shows a diagram computer system in accordance with various implementations.

FIG. 1a shows an example of a computer system 100 including a processing unit duster 110 in accordance with various implementations. Although the example computer system 100 shown in FIG. 1a includes one processing unit cluster 110, other examples of computer system 100 may include a plurality of processing unit clusters 110. As shown in FIG. 1a, the computer system 100 also includes a power adapter 106 and a network adapter 108. Further, the computer system 100 may include a promoting engine 103, which will be described in detail in accordance with software modules in FIG. 3.

The processing unit duster 110 includes a plurality of functional units (e.g., functional units 102 and 104). In one example, the computer system 100 may be a computer including a plurality of core processors, or simply cores. For example, the processing unit duster 110 is a multi-core central processing unit (CPU), and each functional unit (e.g., functional units 102 and 104) is a core of the multi-core CPU.

The functional units of the processing unit cluster 110 (e.g., functional units 102 and 104) may be identical to or different from one another. For example, a first functional unit (e.g., functional unit 102) may be faster than a second functional unit (e.g., functional unit 104). A faster core may operate at a higher clock frequency than a slower core. However, a faster core generally consumes more power than a slower core which computes slower but drains less power than the faster core. Each functional unit may be functioned to execute instructions to provide whatever functionality is required of the system. For example, the system 100 may be configured as a back-end data processing system and each functional unit of the processing unit cluster 110 may execute instructions to help perform whatever back-end data processing functions are required.

Still referring to FIG. 1a, the example power adapter 106 is to receive power from an external power source (e.g., AC power) to provide power for the processing unit cluster 110. Additionally or alternatively, the power adapter 106 may include a power controller, a control bus, and a control bus interface which may be implemented in a variety of known ways, as may best suit a particular application. Details of the power adapter 106 will be described in accordance with FIG. 2.

The example network adapter 108 connects the plurality of the functional units (e.g., functional units 102 and 104) in the processing unit cluster 110 to an external network (e.g., a local area network, wide area network, etc.).

Although there is one power adapter 106 shown in FIG. 1a, in some examples there may be a plurality of power adapters and such adapters may share a common power source (e.g., an AC power connection). Similarly, FIG. 1a shows one network adapter 108 but in some examples, there may be a plurality of network adapters sharing a common network source (e.g., an Ethernet connection). Further, each of the functional units 102, 104 may have a dedicated power adapter 106 or may share a common power adapter 106.

As described above, the example computer system 100 of FIG. 1a may require no dedicated component, and no additional power source or network connection for the computer system 100 to be remotely managed, as might otherwise be the case if the system had a dedicated management unit. Because system 100 does not have a dedicated management unit, the system 100 performs a promoting process (described in more detail below with reference to FIG. 3) to promote one or more of the functional units (e.g., functional units 102 or 104) to function as a management unit via a virtual power supply path and a virtual network communication path. In an alternate implementation, the power supply path used to promote a functional unit may be a physical power supply path.

Figure 1B:
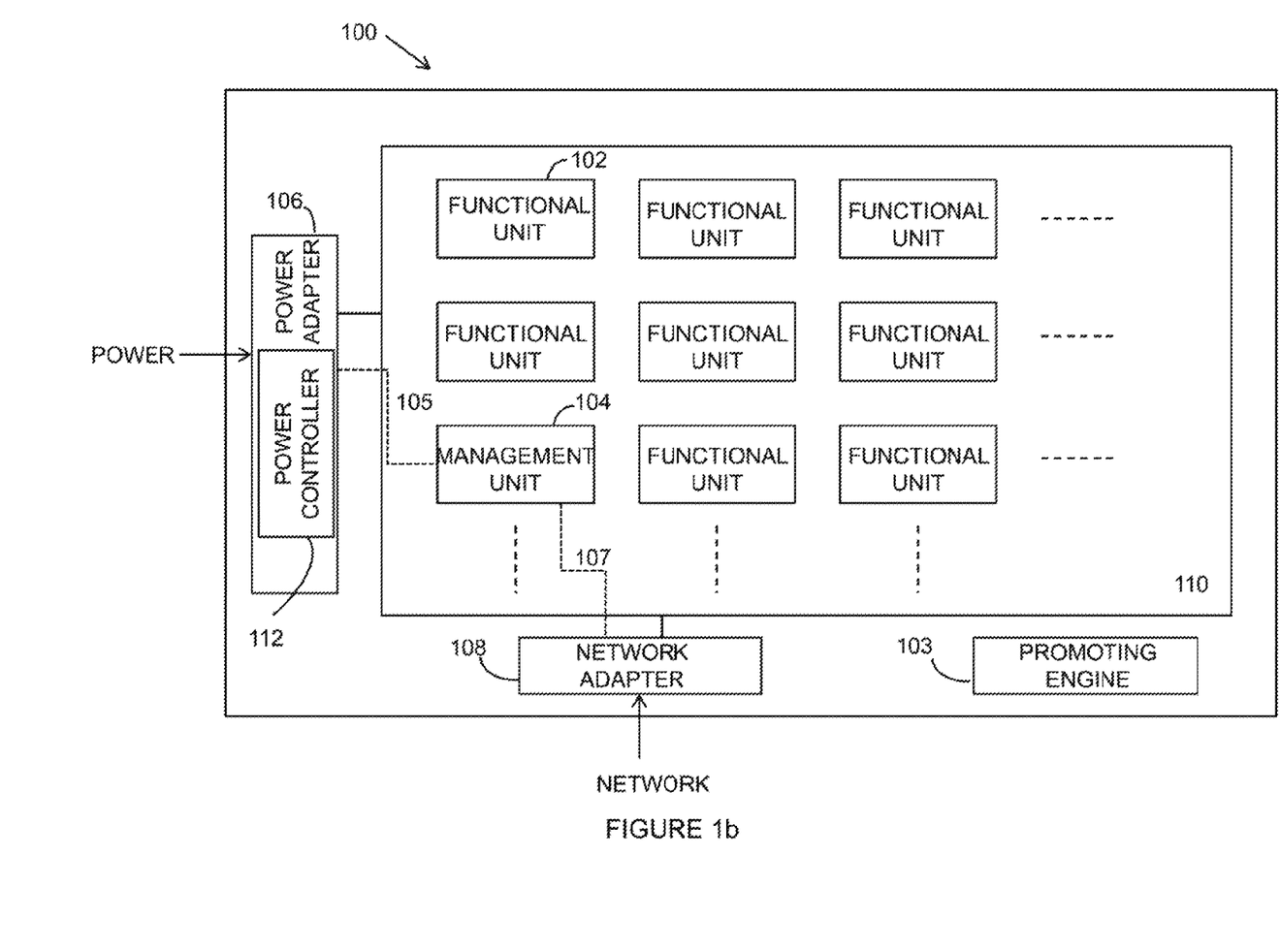
FIG. 1b shows an example of the computer system 100 including a promoted management unit 104 in accordance with various implementations.

FIG. 1b shows the computer system 100 including a promoted management unit 104 in accordance with various implementations. In the example of FIG. 1b, functional unit 104 is shown to have been promoted to function as the management unit, with a virtual power supply path 105 for power and a virtual communication path 107 for network access. As such, according to different management requirements for the computer system 100, one or more management units may be promoted to administrate the computer system 100 dynamically (i.e., during run-time and without interrupting a normal operation of the computer system 100). In accordance with an implementation, the promoting engine 103 may perform one or more configurations of the management requirements dynamically. Based on each of the configured management requirements, the promoting engine 103 promotes one or more functional units to be a management unit via providing a virtual power supply path 105 and a virtual network supply path 107. Functional unit 104 is shown in the example of FIG. 1b as having been promoted to a management unit, but in general, any of the functional units can be promoted to function as a management unit. Further still, more than one functional unit can be promoted at a time to function as management units. Details of an operation of the promoting engine 103 will be described below with reference to FIG. 3.

The administration of the computer system 100 includes any or more of the following: monitoring or analyzing a status of a functional unit or programs hosted by the unit, configuring a functional unit such as turning power on and off, changing power status, configuring the functional units or programs hosted by the unit, performing temperature control, performing fan control of a functional unit, monitoring a status of inventory of a functional unit, monitoring a status of a voltage level of a functional unit, monitoring a status of memory usage of a functional unit, adjusting an inventory of a functional unit, and adjusting a voltage level of a functional unit.

More specifically, in accordance with some implementations, more than one functional unit can be promoted to form a management topology according to the management requirements on, for example, the computing, storage, or communication resource demands of the computer system 100, or the fault zones. A physical or a virtual management topology may be formed for any suitable clusters of functional units or applications. The physical management topology may refer to a management topology that includes a dedicated physical resource (e.g., CPUs) to the management topology. On the other hand, the virtual management topology may refer to a management topology that includes a virtual resource (e.g., a virtual core over the physical CPUs) dedicated to the management topology. The management topology may refer to a layout of the promoted management units and the physical or virtual connections between them. As one example, the management topology may be used for data monitoring, data aggregation and deployment in the computer system 100. As noted above, more than one functional unit can be promoted concurrently as management units. For example, two different processing unit clusters may each have one or more functional units promoted to a management unit. The management unit(s) of different processing unit clusters may coordinate to share the data storage and access and management tasks internally or between the clusters.

To dynamically administrate the computer system 100, the promoting engine 103 may be implemented to dynamically promote a suitable functional unit in a suitable timing based on a configured management requirement. For example, if a management requirement requires that a large number of computationally intensive management tasks need to be processed, the promoting engine 103 may promote one of the cores in a multi-core processor to run monitoring daemons, or promote one or more cores with graphics processing unit (GPU) accelerators to process the computationally intensive management tasks. With respect to the suitable timing to promote, the promoting engine 103 may dynamically configure the management requirement, and, based on a new configured management requirement, promote one or more functional units to be management units. For example, still referring to FIG. 1b, even though the functional unit 104 has been promoted to be a management unit to administrate the computer system 100, during run-time of the computer system 100, a new management requirement may be configured by the promoting engine 103. As such, a new management unit may be promoted to meet the new management requirement. More particularly, CPU frequencies, power management policies and scheduling intervals may change accordingly in response to the operation of the computer system 100 and/or changes in the management requirements. Further, the number of the management units may change during the operation of the computer system 100. For example, if a new management requirement being configured requires an increasing monitoring need, the promoting engine 103 may dynamically promote more functional units to management units. On the other hand, if the monitoring or processing need decreases, the promoting engine 103 may dynamically demote some of the functional units accordingly. In addition to promoting new management units, the configuration of existing management units can also be dynamically changed. For example, the CPU frequencies of management units can be changed and/or the topology among the management units can be changed. In accordance with some implementations, the promoting engine 103 may include a plurality of software modules, and further the promoting engine 103 may be embedded in one of the functional units (e.g., functional units 102 and/or 104) in the computer system 100.

More particularly, the management requirement nay include a utilization threshold of the functional unit 104 and/or the computer system 100 as a whole, quality of service (QoS) requirements, or other requirements that may be suitable for a particular application. For example, the computer system 100 may comprise eight functional units, and each of the functional units may process a particular task. Thus, a workload for each of the functional units may vary, which may result in a plurality of workload characteristics. The management requirement is based on workload characteristics, for instance, a lower utilization threshold defined for a heavier workload.

The virtual power supply path 105 and the virtual network supply path 107 may be established to isolate the promoted management unit(s) (e.g., management unit 104). Further, in one example, the virtual power supply path 105 and the virtual network supply path 107 may only be accessible for the promoted management units (e.g., management unit 104). The virtual power supply path 105 and the virtual network supply path 107 may be established through executing suitable software after a management requirement is configured. Details of the configuration will be described below.

After the functional unit 104 has been promoted to function as the management unit, the now-promoted management unit 104 becomes isolated, in terms of power, network communication and/or other resources, from other functional units (e.g., functional unit 102) which are not being promoted. The management unit 104 may isolate itself after being promoted or a system administrator may isolate the management unit 104 via executing a suitable instruction. For example, the management unit 104 may share the same power adapter 106 with other functional units (e.g., functional unit 102), but, as will be explained with reference to FIG. 2, the management unit 104 includes an individual power management unit to exclusively control a power state of the management unit 104. In some implementations, the power management unit within the management unit may be controlled by a power controller 112 in the power adapter 106 via the virtual power path 105 or a dedicated power control plane. More particularly, the power state of a management unit (e.g., management unit 104) or a functional unit (e.g., functional unit 102) may include switching on off of a particular component in the respective unit (e.g., functional unit 102 and management unit 104).

Isolation of power, network and/or other resources may assure an independent out-of-band management of the computer system 100. For instance, if the power for the computer system 100 is in an off or lower power state or the computer system 100 has malfunctioned (e.g., crashed), the power isolation may be able to maintain the management unit 104 in an on state as long as AC power is provided to the system. Alternatively or additionally, the power isolation may independently reduce a power level of the management unit 104 while other functional units (e.g., functional unit 102) may remain in a full-power state to process a task. Similarly, the network isolation may provide the plurality of the promoted management units (e.g., management unit 104) a private and secure management network for communications, and the resource isolation may prevent other functional units (e.g., functional unit 102) not chosen as the management unit (e.g., management unit 104) from accessing, for example, memory and signals dedicated exclusively for use by the management unit (e.g., 104).

Figure 2:
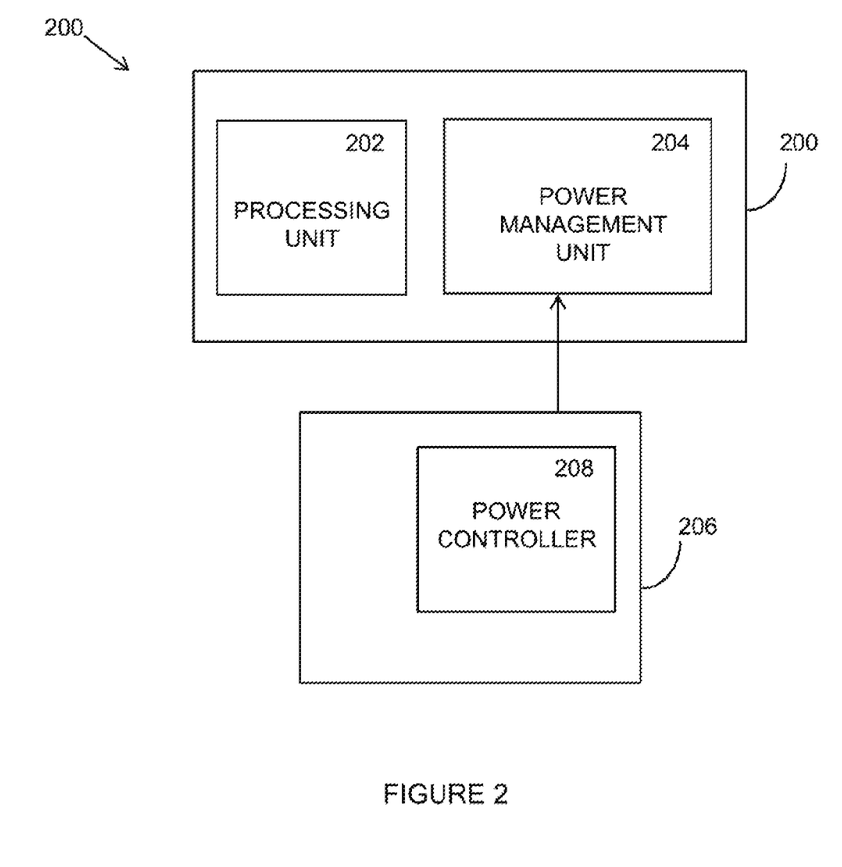
FIG. 2 shows a diagram of a functional unit in accordance with various implementations.

FIG. 2 shows an example functional unit 200 coupled to a power adapter 206 in the computer system 100. After the management unit (e.g., management unit 104) has been promoted, an isolation of power may occur in the management units (e.g., management unit 104) from the non-promoted functional units. To isolate power of the management units, in one implementation, a plurality of functional units (e.g., functional unit 200) may share the same power adapter 206. The power adapter 206 includes a power controller 208 that is to configure a power isolation plan of the computer system 100, and based on the plan, to determine a power level of each coupled functional unit 200.

The functional unit 200 includes a processing unit 202 and a power management unit 204. The processing unit 202 is configured to process a computing task or perform a management function. For example, if the functional unit 200 is promoted to a management unit, the processing unit 202 is to perform a management function such as administrating the computer system 100. Example of administration tasks are provided above. On the other hand, if the functional unit 200 has not been promoted to function as a management unit, the processing unit 202 is to process any suitable, non-management unit computing tasks to be executed by the computer system 100.

More particularly, the processing unit 202 may include a plurality of metal oxide semiconductor field-effect transistors (MOSFETs). The power management unit 204 is configured to communicate with the power controller 208 in the power adapter 206, and to be controlled by the power controller 208 of the power adapter 206 to adjust a voltage level in a particular MOSFET of the processing unit 202. For example, the power controller 208 may control the individual power management unit 204 independently such that electrical power is selectively provided to, or cut off from, each of the elements (e.g., MOSFET) in the processing unit 202.

In some alternate implementations, not every one of the functional units (e.g., functional unit 200) in the computer system 100 may have an individual power management unit (e.g., power management unit 204). In terms of power, the functional units without the individual power management unit (e.g., functional unit 304 of FIG. 3) may be controlled by the promoted management unit (e.g., management unit 104) or the power controller 208.

Figure 3:
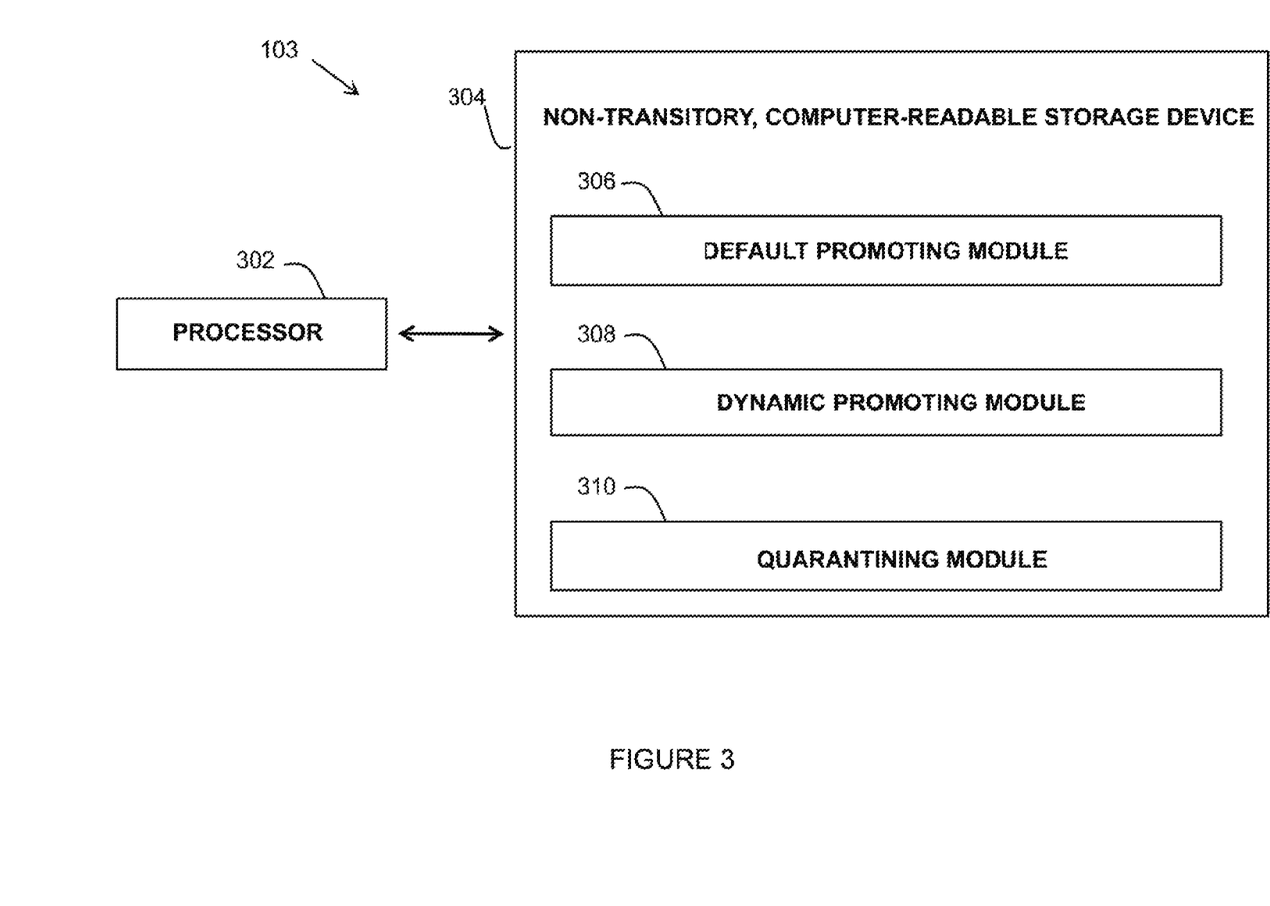
FIG. 3 shows an example of a storage device accordance with various implementations.

FIG. 3 shows a promoting engine 103 to be implemented in the computer system 100. The promoting engine 103 may promote at least one of the functional units to a management unit. In one example, the promoting engine 103 includes a processor 302 coupled to a non-transitory, computer readable storage device 304. The non-transitory, computer-readable storage device 304 may be implemented as volatile storage (e.g., random access memory), non-volatile storage (e.g., hard disk drive, optical storage, solid-state storage, etc.) or combinations of various types of volatile and/or non-volatile storage.

The non-transitory, computer-readable storage device 304 further includes a plurality of software modules that, when executed by processor 302, cause the promoting engine 103 to perform one or more of the functions described herein. The software modules may include a default promoting module 306, a dynamic promoting module 308, and a quarantining module 310. Any function attributed to a software module is understood to be performed by the processor 302 executing the software module.

The processor 302 of the promoting engine 103 executes the default promoting module 306 to promote a non-dedicated functional unit to a management unit in the computer system 100. After the promoting engine 103 promotes the non-dedicated functional unit, the processor 302 may subsequently execute the dynamic promoting module 308 and the quarantining module 310. Further, the non-dedicated management unit may be promoted based on a default management requirement or a management requirement provided by a management agent. As such, there may be more than one non-dedicated functional unit being promoted. The promoted non-dedicated management unit may dynamically configure a new management unit to dynamically promote other functional units to management units.

The non-dedicated functional units may or may not include a promoting engine 103 embedded thereon. If the non-dedicated functional unit does not include an embedded promoting engine 103, the management unit may dynamically configure a management requirement to promote a non-dedicated functional unit. Based on the management requirement, the management unit may dynamically promote other functional units to be management units. Referring to the non-dedicated functional units including an embedded promoting engine 103, in FIG. 3, while the processor 302 executes the dynamic promoting module 308, the promoting engine 103 configures a management requirement of the computer system 100. Based on the configuration, the promoting engine 103 may promote one or more functional units to function as a management unit by executing the default promoting module 306. Further, any functional unit that has already been promoted to function as a management unit may be demoted back to function as a functional unit by execution of the default promoting engine 306, or may remain as the management unit.

Still referring to FIG. 3, regardless of whether a management unit is promoted through executing of the default promoting module 306 or the dynamic promoting module 308, the processor 302 executes the quarantining module 310 to complete the promotion process. For example, the processor 302 executes the quarantining module 310 to quarantine the promoted management unit from other functional units which are not promoted.

More specifically, while the processor 302 executes the quarantining module 310, the promoting engine 103 may quarantine the promoted management unit from the non-promoted functional units in terms of power, network and/or computing/storage resources. For example, for the quarantining of power, even though an emergency shut-off or a crash has occurred to the computer system 100, the promoted management unit may stay on and operate normally while other non-promoted functional units have been enforced to shut off.

Figure 4:
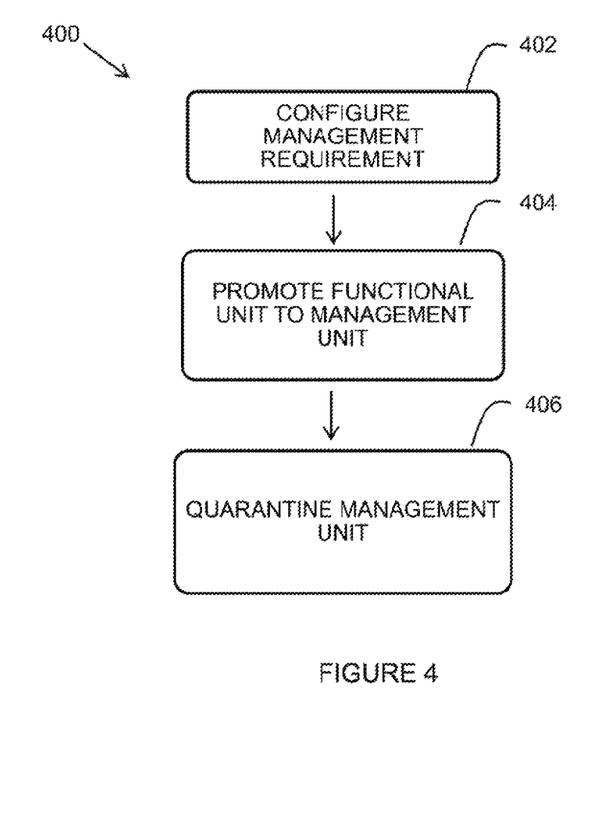
FIG. 4 shows a method for promoting a functional unit to a management unit in accordance with various implementations.

FIG. 4 is a flowchart for promoting a functional unit to function as a management unit in accordance with an implementation. The method 400 starts with block 402 by executing the dynamic promoting module 308 to configure a management requirement in the computer system 100. The management requirement may also be configured by non-dedicated functional units that are promoted to management units by executing the default promoting module 306 of FIG. 3. The computer system 100 may include a plurality of functional units.

Subsequently, in block 404, based on the configuration, one or more functional units in the computer system 100 are promoted to management units via the virtual power path 105 and the virtual network path 107. The promoted management units administrate the computer system 100. The administration may include any one or more of the actions described above.

Despite not being shown in the method 400, the computer system 100 may promote a non-dedicated functional unit to be a management unit without the configuration of the management requirement by executing the default promoting module 306 of FIG. 3.

The method 400 continues with block 406 in quarantining the promoted management units from the functional units not being promoted. Further, the quarantining includes power isolation, network isolation and resource isolation.

The above discussion is meant to be illustrative of the principles and various embodiments of the present invention. Numerous variations and modifications will become apparent to those skilled in the art once the above disclosure is fully appreciated. It is intended that the following dams be interpreted to embrace all such variations and modifications.

What is claimed is:

1. A computer implemented method, comprising:
   configuring a management requirement of a computer system during runtime operation of the computer system, wherein configuring the management requirement comprises specifying a plurality of management tasks to be performed on the computer system, and wherein the computer system comprises a plurality of functional units and is powered via a power source;
   promoting, based on the specified plurality of management tasks, a functional unit to operate as a management unit to administrate functional units in the plurality of functional units not promoted as a management unit, to perform the specified plurality of management tasks; and
   quarantining the management unit from the functional units not promoted as the management unit via a virtual network path and a power management unit,
   wherein the promoting of the functional unit to the management unit comprises promoting the functional unit based on whether the functional unit is comprised in a graphics processing unit (GPU) accelerator.

2. The method of claim 1, wherein the quarantining comprises at least one of:
   isolating power of the management unit from the functional units not promoted as the management unit;
   isolating a network of the management unit from the functional units not promoted as the management unit; and
   isolating a resource of the management unit from the functional units not promoted as the management unit.

3. The method of claim 1, wherein the administration comprises at least one of monitoring or analyzing a status of a functional unit or programs hosted by the functional unit, configuring a functional unit for turning power on and off, changing power status, configuring the plurality of functional units or programs hosted by the plurality of functional units, performing temperature control, performing fan control of a functional unit, monitoring a status of inventory of a functional unit, monitoring a status of a voltage level of a functional unit, monitoring status of memory usage of a functional unit, adjusting an inventory of a functional unit, and adjusting a voltage level of a functional unit.

4. The method of claim 1, wherein the promoting the functional unit to the management unit occurs dynamically during operation of the functional unit.

5. The method of claim 1, wherein the virtual network path is only accessible to the promoted functional unit.

6. The method of claim 1, wherein the promoting comprises promoting a plurality of functional units to management units.

7. The method of claim 1, wherein the promoting comprises promoting a plurality of functional units to management units thereby forming a management topology.

8. The method of claim 1, wherein promoting the functional unit to the management unit comprises promoting the functional unit to run a monitoring daemon.

9. A system, comprising:
   a plurality of functional units powered via a power source;
   wherein, based on a configuration of the system specifying a plurality of management tasks to be performed on the system, a first functional unit of the plurality of functional units is promoted by a second functional unit of the plurality of functional units to a management unit to administrate operations of the system; and once the first functional unit is promoted, the management unit is quarantined by a quarantining module from functional units from the plurality of functional units not promoted to the management unit via a virtual network path, virtual power supply path, and a power management unit, wherein the promoting of the first functional unit to the management unit comprises promoting the first functional unit based on whether the first functional unit is comprised in a graphics processing unit (GPU) accelerator.

10. The system of claim 9, wherein the virtual network path is only available for the promoted first functional unit in the system.

11. The system of claim 9, wherein a plurality of functional units are promoted to be management units to form a management topology, the management topology dynamically adapting to changes in the management requirement.

12. The system of claim 9, wherein the first functional unit of the plurality of functional units comprises a core of a multi-core central processing unit (CPU) and no functional unit is dedicated to be promoted.

13. The system of claim 9 wherein the second functional unit is to dynamically change which functional unit is promoted to a management unit, dynamically promote an additional function unit to be a management unit, dynamically change a frequency of a central processing unit (CPU) of an existing management unit, dynamically change a management topology, or dynamically create a management topology among a plurality of functional units promoted to management units.

14. The system of claim 9, wherein the management unit is isolated from the plurality of functional units by power, network, and system resources.

15. A non-transitory, computer readable storage device containing executable instructions that, when executed by a processor, causes the processor to:

in response to a configuration representing a plurality of management tasks to be performed on a computer system, promote a default central processing unit (CPU) core of the computer system to a management core, wherein the computer system comprises a plurality of CPU cores, and wherein the management core is to administrate the computer system during runtime operation of the computer system;

dynamically change which CPU of the plurality of CPU cores is promoted to the management core to promote other CPU cores other than the default CPU core as management cores; and quarantine the management core from the CPU cores not being promoted, wherein the quarantining comprises isolating power, network and a resource of the computer system, wherein the promoting of the default CPU core to the management core comprises promoting the default CPU core based on whether the default CPU core is comprised in a graphics processing unit (GPU) accelerator.

16. The non-transitory, computer readable storage device of claim 15, wherein the instructions cause the processor to quarantine the management core via a virtual network path and a power management unit.

17. The non-transitory, computer readable storage device of claim 15, wherein the instructions, when executed by the processor, cause the processor to provide a virtual network path to the management core.

* * * * *